United States Patent [19]

Azuma et al.

[11] Patent Number: 4,785,042

[45] Date of Patent: Nov. 15, 1988

[54] POLYETHYLENE RESIN COMPOSITION CONTAINING AMORPHOUS ALUMINOSILICATES FOR IMPROVED FILMS

[75] Inventors: Yutaka Azuma, Sodegaura; Yoshikatsu Tanaka, Ichihara, both of Japan

[73] Assignee: Idemitsu Petrochemical Co., Ltd., Tokyo, Japan

[21] Appl. No.: 120,217

[22] Filed: Nov. 10, 1987

Related U.S. Application Data

[63] Continuation of Ser. No. 900,735, Aug. 27, 1986, abandoned.

[30] Foreign Application Priority Data

Sep. 13, 1985 [JP] Japan .............................. 60-201734
Sep. 13, 1985 [JP] Japan .............................. 60-201735
Jun. 26, 1986 [JP] Japan .............................. 61-150028
Jun. 27, 1986 [JP] Japan .............................. 61-149657

[51] Int. Cl.$^4$ .......................... C08K 3/10; C08K 3/34; C08K 5/20

[52] U.S. Cl. ................................... 524/210; 524/220; 524/231; 524/232; 524/243; 524/444; 524/450; 524/586

[58] Field of Search ............... 524/450, 444, 586, 210, 524/231, 232, 220, 243

[56] References Cited

U.S. PATENT DOCUMENTS

| | | | |
|---|---|---|---|
| 3,428,595 | 2/1969 | Tsokada et al. | 524/450 |
| 4,250,081 | 2/1981 | Bode et al. | 524/450 |
| 4,542,061 | 9/1985 | Fukushimu et al. | 428/516 |
| 4,560,609 | 12/1985 | Fukushimu et al. | 428/516 |
| 4,704,424 | 11/1987 | Sands | 524/586 |

FOREIGN PATENT DOCUMENTS

| | | | |
|---|---|---|---|
| 2213954 | 8/1974 | France | 524/586 |
| 22612 | 9/1969 | Japan | 524/444 |
| 01511041 | 11/1980 | Japan | 524/450 |
| 151043 | 11/1980 | Japan | 524/444 |
| 151042 | 11/1980 | Japan | 524/444 |
| 0067638 | 4/1982 | Japan | 524/450 |
| 22944 | 2/1984 | Japan | 524/450 |
| 156913 | 9/1984 | Japan | 423/328 |
| 0192742 | 10/1985 | Japan | 524/450 |
| 0822498 | 10/1959 | United Kingdom | 524/586 |
| 1175060 | 12/1969 | United Kingdom | 524/586 |

Primary Examiner—John C. Bleutge
Assistant Examiner—David W. Woodward
Attorney, Agent, or Firm—Frishauf Holtz Goodman & Woodward

[57] ABSTRACT

The object of the present invention is to provide a polyethylene resin composition which is improved in antiblocking and slipping properties, and further in antistatic properties without deteriorating the excellent properties of polyethylene, such as transparency and heat sealability.

The inventive polyethylene resin composition comprises (A) polyethylene,
(B) a zeolite or an anhydrous amorphous aluminosilicate having the basic particle characteristics of zeolite as prepared by acid-treating zeolite,
(C) fatty acid amide having a melting point of not more than 130° C., and
(D) an antistatic agent.

12 Claims, No Drawings

POLYETHYLENE RESIN COMPOSITION CONTAINING AMORPHOUS ALUMINOSILICATES FOR IMPROVED FILMS

This application is a continuation of application Ser. No. 900,735, filed Aug. 27, 1986, now abandoned.

BACKGROUND OF THE INVENTION

The present invention relates to a polyethylene resin composition which can be effectively used as wrapping materials, agricultural film materials and so forth.

Polyethylenes such as straight-chain low density polyethylene (LLDPE) are used as wrapping materials, agricultural film materials and so forth because of their excellent mechanical properties, heat sealability and transparency.

These polyethylenes, however, have a disadvantage of being tacky; that is, since the polyethylenes have poor sliding properties and also are liable to cause blocking, they tend to cause problems such as a reduction in the efficiency of operation during production or fabrication of films, as well as difficulties at the time of wrapping.

It is known that powdered zeolite is added to polypropylene to improve its antiblocking properties (Japanese Patent Publication No. 16134/1977).

The present inventors have made extensive investigations to develop a polyethylene composition which is improved in anti-blocking and slipping properties, and further in antistatic properties without deteriorating the excellent properties of polyethylene, such as transparency and heat sealability, and thus which is of high practical value.

As a result, it has been found that the above object can be attained by adding a zeollite or an anhydrous amorphous aluminosilicate having the basic particle characteristics of zeolite as prepared by acid-treating zeolite, if necessary, specific fatty acid amide and antistatic agent in specified amounts based on the weight of polyethylene.

SUMMARY OF THE INVENTION

The object of the present invention is therefore to provide a polyethylene resin composition which is improved in anti-blocking and slipping properties, and further in antistatic properties without deteriorating the excellent properties of polyethylene, such as transparency and heat sealability.

More specifically, the present invention relates to a polyethylene resin composition comprising:
(A) 100 parts by weight of polyethylene
(B) 0.01 to 2.0 parts by weight of a zeolite or an anhydrous amorphous aluminosilicate having the basic particle characteristics of zeolite as prepared by acid-treating zeolite,
(C) 0 to 1.5 parts by weight of fatty acid amide having a melting point of not more than 130° 1 C., and
(D) 0 to 3.0 parts by weight of an antistatic agent.

DETAILED DESCRIPTION OF THE PREFERRED EMBODIMENTS

There are no special limitations to polyethylene which is used in the present invention as the component (A).

As the component (A), low density polyethylene can be used preferably.

Particularly preferred in the present invention is straight-chain low density polyethylene (LLDPE).

And also a blend of the above LLDPE and a high pressure process low density polyethylene can be used as the component (A). This LLDPE is prepared by copolymerizing ethylene and 0.2 to 20 mol% or, preferably 0.5 to 15 mol% or, more preferably 1 to 10 mol% of one or mmore of $\alpha$-olefins having 3 to 12 carbon atoms, such as propylene, butene-1, pentene-1, hexene-1, 4-methyl-pentene-1, octene-1, and decene-1 in the liquid phase or the gas phase. Such LLDPEs have a density of 0.910 to 0.960 g/cm$^3$, preferably 0.915 to 0.940 g/cm$^3$, and a melt index (MI) of 0.5 to 10 g/10 min (grams per ten minutes), preferably 0.8 to 6.0 g/10 min. And also this LLDPE is prepared by copolymerizing in the liquid phase or the gas phase 90 to 99 mol% of an ethylene unit, 0.4 to 9.5 mol%, preferably 0.5 to 5 mol% of an $\alpha$-olefin unit (having 3 to 4 carbon atoms; e.g., propylene and butene-1), and 0.4 to 9.5 mol%, preferably 0.5 to 5 mol% of an $\alpha$-olefin unit (having 6 to 12 carbon atoms; e.g., hexene-1, 3-methyl-pentene-1, 4-methyl-pentene-1, octene-1 and decene-1. Suitable Examples of such LLDPEs are an ethylene-propylene-octene-1 copolymer and an ethylene-butene-octene-1 copolymer. Particularly suitable is the ethylene-butene-octene-1 copolymer. For these LLDPE, the melt flow rate (MFR=flow rate/melt index; the flow rate is measured according to ASTM D-1238 under Condition E, ten times the weight used in the melt index test as described below) is 18 to 52 and preferably 23 to 48, the density (measured according to JIS K7110: the density gradient tube method) is 0.910 to 0.940 g/cm$^3$ and preferably 0.910 to 0.936 g/cm$^3$, and the melt index (MI: measured according to ASTM D-1238 under Condition E: 190° C.) is 0.1 to 10 g/10 min and preferably 0.5 to 5 g/10 min. If MFR if less than 17, the mold-ability of the resin composition is decreased. On the other hand, if MFR is in excess of 52, transparency is deteriorated. When MFR is within the range of 23 to 48, there can be obtained a resin composition having good impact resistance.

The above LLDPE can be produced by known methods. For example, $\alpha$-olefins are fed to the polymerization system in such a manner that each $\alpha$-olefin unit content is within the above specified range and then random copolymerized in the liquid phase or the gas phase to produce the desired LLDPE. In this case, the ratio of the $\alpha$-olefins supplied is controlled by suitably choosing the type of the $\alpha$-olefin, the polymerization temperature, the ethylene partial pressure and so forth.

In the present invention, as the component (B), a zeolite or an anhydrous amorphous aluminosilicate having the basic particle characteristics of zeolite as prepared by acid-treating zeolite is used.

This zeolite as the component (B-1) is an aluminosilicic acid salt having the formulation represented by the general formula:

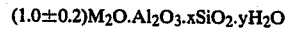

$(1.0\pm0.2)M_2O.Al_2O_3.xSiO_2.yH_2O$ (wherein M represents Na or a univalent or polyvalent metal of the same equivalent as Na, x represents 1.5 to 20, and y represents 0 to 10) and having a unique crystal structure which can be identified by X-ray diffraction. The zeolite may be natural or synthetic. Representative examples of such zeolites are A-type zeolite, P-type zeolite, X-type zeolite, Y-type zeolite, soda lite, and analcime. These zeolites can be used alone or in combination with each other. Of these zeolites, A-type zeolite and X-type zeolite which are nearly spherical in the shape are preferred in the present invention. Particularly preferred is A-type zeolite from an industrial standpoint.

The A-type zeolite is a crystalline alumino silicic acid salt represented by the general formula:

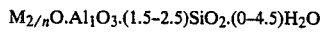

$$M_{2/n}O.Al_1O_3.(1.5-2.5)SiO_2.(0-4.5)H_2O$$

(wherein M represents an alkali metal or an alkaline earth metal, and n represents the atomic valency of M), and having a cation exchange capability and a crystal structure belonging to the isometric system. Representative examples of such A-type zeolites are sodium A-type zeolite, pottasium A-type zeolite, calcium A-type zeolite and magnesium A-type zeolite. These zeolites can be used alone or in combination with each other. In addition, zeolites in which the above cations are present in the same crystal can be used.

As the component (B-2), anhydrous amorphous alumino-silicate having the basic particle characteristics of zeolite as prepared by acid-treating zeolite can be used in place of above described zeolite as the component (B-1). The zeolite which is used as the component (B-2) of the present invention has the basic particle characteristics of zeolite, such as a particle form and a particle size distribution, but is anhydrous and amorphous and does not have the crystal structure that zeolite has. The term "amorphous zeolite" as used herein includes both a zeolite in the X ray diffraction pattern of which no diffraction peak is observed, and a zeolite in the X ray diffraction pattern of which the height of the diffraction peak is decreased to not more than a half of the original height and which is substantially amorphous. The anhydrous amorphous aluminosilicate to be used as the component (B-2) of the present invention may be an amorphous aluminosilicate which is made anhydrous by subjecting it to heat dehydration treatment in advance, or an amorphous aluminosilicate which is made anhydrous through heat treatment at the time of kneading with the other components. The average particle diameter of the anhydrous amorphous aluminosilicate to be used as the component (B-2) of the present invention is preferably 0.5 to 5 μm and more preferably 1.5 to 3.5 μm. Furthermore it is preferred for the anhydrous amorphous aluminosilicate to have such a particle size distribution that particles having a particle diameter falling within the range of ½ to 3/2 of the average particle diameter constitute not less than 50% of all particles. It is preferred that the particle form of the component (B-2) be spherical or cubic provided that the edges are round, and that the particle surface be smooth. The above anhydrous amorphous aluminosilicate can be prepared by various methods. One of the methods is illustrated below.

Zeolite to be used as the starting material may be natural or synthetic. It is preferred to use zeolite in which the molar ratio of $SiO_2$ to $Al_2O_3$ ($SiO_2/Al_2O_3$) is not more than 5/1, especially not more than 4/1. The reason for this is that the characteristic crystal structure of zeolite having a $SiO_2/Al_2O_3$ molar ratio falling within the above specified range is readily decomposed by the acid treatment as described hereinafter. Representative examples of such zeolites are A-type zeolite, P-type zeolite, X-type zeolite and Y-type zeolite. They can be used alone or in combination with each other. Particularly preferred in the present invention is to use A-type zeolite and X-type zeolite which are nearly spherical in the shape.

This zeolite is then subjected to acid treatment. This acid treatment provides zeolite which is substantially amorphous while holding the basic particle characteristics thereof. This acid treatment is carried out by adding an acid such as sulfuric acid and phosphoric acid, or an acid substance to an aqueous slurry of zeolite. In this acid treatment, pH of the aqueous slurry of zeolite is adjusted to 4.5-9 and preferably 5-7; that is, made weakly acidic. If the pH of the aqueous slurry is less than 4.5, the basic particle characteristics of zeolite, such as a particle form and a particle size distribution undesirably undergo serious changes, or the whole particles are undesirably dissolved or disappear. On the other hand, if the pH of the aqueous slurry is in excess of 9, the zeolite is undesirably difficult to make amorphous.

The above-prepared amorphous aluminosilicate having the basic particle characteristics of zeolite is subjected to heat dehydration treatment to provide anhydrous amorphous aluminosilicate. This heat dehydration treatment is carried out by heating the above amorphous aluminosilicate at a temperature of not less than 240° C., preferably 250° to 500° C.

In the manner as described above, the component (B-2) of the present invention is obtained. Since the component (B-2) has been subjected to the above defined acid treatment, it does not adsorb water unlike zeolite subjected to the usual heat dehydration treatment. Thus, the adverse influences of water exerted at the molding step can be substantially prevented. Furthermore the component (B-2) does not substantially deteriorate the transparency inherent to polyethylene. The component (B-2) is usually of the Na type, and the cation exchange capability characteristics of zeolite substantially disappears. However, by utilizing the slightly remaining cation exchange capability, Na+ can be replaced with other cations such as $Ca^{++}$, $Mg^{++}$, $Ba^{++}$, $Zn^{++}$ and $Pb^{++}$. Furthermore it may be coated with metal hydroxides such as the hydroxides of aluminum, titanium, zirconium and antimony, or amorphous silica, for example.

In the present invention, the component (B) is added in an amount of 0.01 to 2.0 parts by weight, preferably 0.05 to 1.5 parts by weight per 100 parts by weight of the above component (A). If the amount of the component (B) added is less than 0.01 part by weight, anti-blocking cannot be increased. On the other hand, if the amount of the component (B) added is in excess of 2.0 parts by weight, transparency is undesirably decreased.

In the present invention, as the component (C), fatty acid amide having a melting point of not more than 130° C., preferably 60° to 120° C. is used. Examples of such fatty acid amides are erucic acid amide, stearic acid amide, oleic acid amide, behenic acid amide, N-stearylbutyric acid amide, N-stearylcaprylic acid amide, N-stearyllaurylic acid amide, N-stearylstearic acid amide, N-stearylbehenic acid amide, N-oleyloleic acid amide, N-oleylbehenic acid amide, N-butylerucic acid amide, N-octylerucic acid amide, and N-laurylerucic acid amide. Of these compounds, erucic acid amide is particularly preferred. If, however, fatty acid amide having a melting point in excess of 130° C. is used as the component (C), anti-blocking properties are undesirably decreased. The component (C) mainly contributes to an increase in slipping and sliding properties.

In the present invention, the amount of the component (C) added is 0 to 1.5 parts by weight, preferably 0.03 to 1.0 part by weight per 100 parts by weight of the component (A). If the amount of the component (C) added is in excess of 1.5 parts by weight, heat sealability is undesirably decreased. In the present invention, it is preferred to use erucic acid amide as the component (C). In this case, the suitable amount of the erucic acid amide used is 0.05 to 0.4 part by weight for the general films (having a thickness of 20 to 30 μm), 0.05 to 0.2 part by weight for agricultural films (having a thickness of 50 to 60 μm), and not more than 0.1 part by weight for heavy duty films (having a thickness of 150 to 200 μm).

In the present invention, as the component (D), an antistatic agent is used. Any of cationic, anionic, nonionic and amphoteric antistatic agents can be used. Representative examples of such antistatic agents are cationic compounds such as primary amine salts, tertiary amines, quaternary ammonium compounds and pyridine derivatives, anionic compounds such as sulfated oil, soap, sulfated ester oil, sulfated amide oil, sulfuric acid ester salts of olefins, fatty alcohol sulfuric acid ester salts, alkylsulfuric acid ester salts, fatty acid ethylsulfonic acid salts, alkylnahpthalenesulfonic acid salts, alkylbenzenesulfonic acid salts, succinic acid ester sulfonic acid salts, and phosphoric acid ester salts, nonionic compounds such as partial fatty acid esters of polyhydric alcohols, ethylene oxide adducts of fatty alcohols, ethylene oxide adducts of fatty acid, ethylene oxide adducts of polyfatty amino or fatty acid amides, ethylene oxide adducts of alkylphenols, ethylene oxide adducts of alkylnaphthaols, ethylene oxide adducts of partial fatty acid esters of polyhydric alcohols, and polyethylene glycol, and amphoteric compounds such as carboxylic acid derivatives and imidazoline derivatives.

Of the above compounds, nonionic compounds are preferred. Particularly preferred are polyoxyethylenealkylamine and polyoxyethylene alkylamide, and their fatty acid esters and glycerine fatty acid esters.

In the present invention, the amount of the component (D) added is 0 to 3.0 parts by weight, preferably 0.1 to 1.5 parts by weight per 100 parts by weight of the component (A). If the amount of the component (D) added is in excess of 3.0 parts by weight, tackiness and whitening undesirably readily occur as a result of bleeding.

The polyurethane resin composition of the present invention comprised the above components (A), (B), (C) and (D). If desired, additives such as a lubricant, an antioxidant, a weathering agent, an anti-fogging agent, and a colorant can be added to the polyethylene resin composition of the present invention. Representative examples of the lubricant are metal soaps such as calcium stearate, zinc stearate, and barium stearate. As the antioxidant, phenol-, phosphorous-ous, amine- and sulfur base antioxidants can be used.

The polyethylene resin composition of the present invention is prepared by mixing the above components by the usual method. More specifically, (1) the polyethylene resin composition of the present invention can be prepared by melt mixing the above components at 160°–230° C. by the use of a Bumbury's mixer, a cokneader, or a knead-extruder, for example, or (2) the polyethylene resin composition of the present invention can be prepared by first preparing a master batch containing high concentrations of the components (B), (C) and (D), and mixing the master batch with polyethylene as the component (A) at the time of film formation.

The polyethylene resin composition of the present invention as prepared above is molded into a film, for example, by the use of various film molding apparatuses, and is used as a wrapping material, or an agricultural film, for example.

According to the polyethylene resin composition of the present invention, a polyethylene film having excellent antiblocking and slipping properties can be used.

Thus, troubles such as formation of wrinkle and attachment of dust do not occur at a slitter in production of films, or at the fabrication steps of printing, bagmaking or the like, and the productivity can be greatly increased.

In the polyethylene resin composition of the present invention, excellent properties characteristic of polyethylene, such as transparency, heat sealability and appearance are not deteriorated at all, and thus the polyethylene resin composition of the present invention is of practical value and further is improved in antistatic properties, for example.

In the case that LLDPE produced by copolymerizing the specified monomers is used as component (A), a polyethylene film which is excellent in properties such as impact resistance and transparency and further in antiblocking, slipping and antistatic properties.

In the case that the anhydrous amorphous aluminosilicate having the basic particle characteristics of zeolite as prepared by acid-treating zeolite is used as component (B), it is able to avoid the adverse influences of water at the molding step, and thus a polyethylene film having excellent antiblocking and alipping properties can be obtained.

Accordingly the polyethylene resin composition of the present invention is useful in production of various wrapping materials, agricultural film materials and so forth.

The present invention is described in greater detail with reference to the following examples.

EXAMPLES 1 TO 9, AND COMPARATIVE EXAMPLES 1 TO 4

Predetermined amounts of the compounds (A), (B) and (C) as shown in Table 1 were compounded, kneaded in a twin screw kneader at 200° C., and extruder in a tubular form at an extrusion temperature of 190° C. by the use of an extruder having a diameter of 50 mm. The film thus produced having a thickness of 20 μm was measured by the following methods, and the results are shown in Table 1.

Physical Property Measuring Methods (1) Blocking Properties

Two 5 cm×25 cm test pieces were superposed, and 9 kg of a load was placed thereon. The assembly was allowed to stand at 60° C. for 3 hours. Then the two pieces were separated in an up-and-down direction at a pulling speed of 200 mm/min, and the maximum value (g/100 cm$^2$) was determined.

(2) Static Coefficient of Friction

Measured according to ASTM D 1894.

(3) Visible Transparency

Narrow transmitted light amount measured by the use of a visible transparency testor (manufactured by Toyo Seiki Seisakujo)

(4) Heat Sealability

A 4×20 cm test piece was heat sealed with a heat seal width of 1×2.5 cm and under a pressure of 2 kg/cm$^2$ for 1 second and then allowed to stand for 30 minutes. Then the sealed part was separated at a pulling speed of 200 mm/min, and the strength (g) was measured.

(5) Antistatic Properties

The antistatic properties were evaluated by the Ash Test method and rated as follows.

○ ... Even if the film is approached to ash to a height of 1 to 3 cm, no attachment of ash occurs.

Δ ... Even if the film is approached to ash to a height of 3 to 7 cm, no attachment of ash occurs.

× ... If the film is approached to a height of not more than 7 cm, attachment of ash occurs.

EXAMPLES 10 AND 11

A 90 μm thick film was produced in the same manner as in Examples 1 to 9, and was measured for physical properties. The results are shown in Table 1.

EXAMPLE 12

A film was produced in the same manner as in Example 1 except that a blend of 80 wt% of the same straight chain low density polyethylene as used in Example 1 and 20 wt% of high pressure process low density polyethylene (density, 0.921 g/cm$^3$; MI, 3.0 g/10 min) was used as the component (A) and the amount of the component (B) added was changed to 0.5 part by weight, and then was measured for physical properties. The results are shown in Table 1.

EXAMPLE 13

A film was produced in the same manner as in Example 1 except that a blend of 80 wt% of the same straight chain low density polyethylene as used in Example 1 and 20 wt% of high pressure process low density polyethylene (density, 0.921 g/cm$^3$; MI, 3.0 g/10 min) was used as the component (A), the amount of the component (B) added was changed to 0.3 part by weight and the amount of the component (C) added was changed to 0.15 past by weight, and then was measured for physical properties. The results are shown in Table 1.

EXAMPLES 14 TO 22 AND 25, AND COMPARATIVE EXAMPLES 5 TO 9

Films were produced in the same manner as in Examples 1 to 9 and Comparative Examples 1 to 4 except that the predetermined amounts of the components (A), (B), (C) and (D) as shown in Table 1 were used, and then were measured for physical properties. The results are shown in Table 1.

EXAMPLES 23 AND 24

90 μm thick films were produced in the same manner as in Examples 14 to 22 and 25, and then were measured for physical properties. The results are shown in Table 1.

TABLE 1

| | Formulation | | | | | | | | Physical Properties | | | | | |
|---|---|---|---|---|---|---|---|---|---|---|---|---|---|---|
| | Component (A) *1 | | Component (B) *2 | | Component (C) *3 | | Component (D) *4 | | | | | | | |
| | Type | Parts by weight | Type | Parts by weight | Type | Parts by weight | Type | Parts by weight | Blocking Properties (g/100 cm²) | Static Coefficient of Friction | Visible Transparency | Heat Sealability | Antistatic Properties | Remarks |
| Example 1 | LL-I | 100 | a | 0.2 | e | 0.2 | — | — | 10 | 0.11 | 10.0 | 990 | — | |
| Example 2 | " | " | " | 0.5 | " | 0.1 | — | — | 9 | 0.09 | 10.9 | 950 | — | |
| Example 3 | " | " | b | 0.3 | " | 0.2 | — | — | 10 | 0.10 | 10.3 | 980 | — | |
| Example 4 | " | " | c | 0.2 | f | 0.2 | — | — | 11 | 0.09 | 9.6 | 950 | — | |
| Example 5 | " | " | a | 0.2 | g | 0.02 | — | — | 8 | 0.13 | 10.4 | 930 | — | |
| Example 6 | " | " | " | 0.2 | e | 0.8 | — | — | 9 | 0.09 | 12.6 | 940 | — | |
| Example 7 | LL-II | " | " | 0.1 | " | 0.1 | — | — | 11 | 0.08 | 10.3 | 980 | — | |
| Example 8 | LL-I | " | b | 0.15 | " | 0.1 | — | — | 9 | 0.11 | 9.6 | 970 | — | |
| Example 9 | " | " | d | 0.2 | " | 0.2 | — | — | 6 | 0.10 | 10.3 | 1040 | — | |
| Comparative Example 1 | " | " | — | — | " | 0.2 | — | — | 45 | 0.10 | 7.7 | 980 | — | *6 |
| Comparative Example 2 | " | " | a | 3.0 | " | 0.2 | — | — | 6 | 0.09 | 20.3 | 970 | — | |
| Comparative Example 3 | LL-I | 100 | a | 0.2 | " | 2.0 | — | — | 10 | 0.08 | 11.0 | 700 | — | |
| Comparative Example 4 | " | " | " | 0.2 | h | 0.2 | — | — | 41 | 0.60 | 10.3 | 850 | — | |
| Example 10 | LL-I | " | " | 0.2 | — | — | — | — | 11 | — | 16.8 | 4600 | — | |
| Example 11 | LL-II | " | b | 0.15 | f | 0.05 | — | — | 14 | — | 18.1 | 4600 | — | |
| Example 12 | LL-III | " | a | 0.5 | e | 0.2 | — | — | 10 | 0.10 | 9.4 | 950 | — | |
| Example 13 | LL-III | " | " | 0.3 | " | 0.15 | — | — | 15 | 0.11 | 8.7 | 950 | — | |
| Example 14 | LL-I | " | " | 0.6 | " | 0.25 | i | 0.4 | 10 | 0.10 | 12.9 | 970 | — | |
| Example 15 | " | " | " | 1.2 | " | 0.2 | " | 0.7 | 11 | 0.12 | 14.5 | 950 | ○ | |
| Example 16 | " | " | b | 0.7 | " | 0.15 | " | 0.3 | 10 | 0.13 | 13.2 | 970 | ○ | |
| Example 17 | " | " | c | 0.6 | f | 0.1 | " | 0.5 | 11 | 0.12 | 12.5 | 990 | ○ | |
| Example 18 | " | " | a | 0.5 | g | 0.05 | " | 0.6 | 12 | 0.13 | 12.4 | 980 | ○ | |
| Example 19 | LL-I | " | " | 0.8 | e | 0.80 | " | 0.8 | 9 | 0.14 | 14.0 | 960 | ○ | |
| Example 20 | LL-II | " | " | 0.3 | " | 0.10 | " | 0.4 | 11 | 0.13 | 12.0 | 1100 | ○ | |
| Example 21 | " | " | b | 0.6 | " | 0.10 | " | 0.8 | 10 | 0.12 | 12.6 | 1080 | ○ | |
| Example 22 | LL-III | " | " | 0.6 | " | 0.2 | " | 0.5 | 13 | 0.12 | 12.3 | 950 | ○ | |
| Example 23 | LL-I | " | a | 0.6 | — | — | " | 0.5 | 16 | 0.11 | 13.7 | 4500 | ○ | |
| Example 24 | LL-II | " | " | 0.4 | f | 0.07 | " | 0.5 | 22 | 0.10 | 14.2 | 4800 | ○ | |
| Example 25 | LL-I | " | d | 0.8 | e | 0.2 | " | 0.4 | 9 | 0.11 | 12.4 | 980 | ○ | |
| Comparative Example 5 | " | " | — | — | " | 0.2 | " | 0.4 | 105 | 1.6< | 11.9 | 1000 | ○ | *6 |
| Comparative Example 6 | " | " | a | 0.5 | " | 2.0 | i | 0.4 | 10 | 0.10 | 13.7 | 700 | ○ | |
| Comparative Example 7 | " | " | " | 0.5 | " | 0.2 | " | 3.5 | 45 | 0.26 | 13.1 | 850 | ○ | *7 |
| Comparative Example 8 | LL-I | " | " | 0.5 | h | 0.07 | " | 0.4 | 90 | 1.6< | 13.0 | 950 | ○ | |
| Comparative Example 9 | LL-I | " | *5 *1 | 0.7 | e | 0.2 | " | 0.4 | 9 | 0.10 | 16.0 | 960 | × | |

*5: Synthetic Silica
*1: Polyethylene
LL-I: Straight-chain low density polyethylene (density: 0.920 g/cm³; MI: 1.0 g/10 min; butene-1 content: 5 mol %)
LL-II: Straight-chain low density polyethylene (density: 0.935 g/cm³; MI: 4.0 g/10 min; octene-1 content: 11 mol %)

TABLE 1-continued

LL-III: Blend of 80 wt % of LL-I and 20 wt % of high pressure process low density polyethylene (density: 0.921; MI: 3.0 g/10 min)
*2 Aluminosilicate
a: Na—4A type-zeolite sulfuric acid treated product (average particle diameter: 2.8 μm; particles having a particle diameter falling within the range of ½ to 3/2 of the average particle diameter constitute 90% of all particles: manufactured by Nippon Kagaku Kogyo Co. Ltd.; trade name: NA-210P
b: Na—4A type zeolite sulfuric acid treated product (average particle diameter: 2.0 μm; particles having a particle diameter falling within the range of ½ to 3/2 of the average particle diameter constitute 80% of all particles; manufactured by Mizusawa Kagaku Kogyo Co., Ltd.; trade name: Sirton AM (T))
c: Na—13X-type zeolite phosphoric acid treated product (average particle diameter: 2.2 μm; particles having a particle diameter falling within the range of ½ to 3/2 of the average particle diameter constitute 95% of all particles)
d: Na—4A-type zeolite (manufactured by Toyo Soda Kogyo Co., Ltd.; trade name: Toyo Bilder)
*3 Fatty Acid Amide
e: Erucic acid amide (m.p., 79-83° C.)
f: Stearic acid amide (m.p., 99-105° C.)
g: Behenic acid amide (m.p., 108-115° C.)
h: Ethylenebisstearic acid amide (m.p., not less than 140° C.)
*4 Antistatic Agent
i: Nonionic antistatic agent (manufactured by Marubushi Yuka Kogyo Co., Ltd.; trade name: Denon 2527; a mixture of glycerine monoester and polyoxyethylene alkylamine)
j: Nonionic antistatic agent (manufactured by Kao Co., Ltd.; trade name: Electrostripper TS-7, a mixture of glycerine monoester and polyoxyethylene alkylamine)
*5 Synthetic Silica
Average particle diameter: 4.0 μm; specific surface: 300 m²/g
*6 Appearance becomes bad as a result of foaming.
*7 White powder attaches to a pinch roll.

EXAMPLE 26 TO 34, AND COMPARATIVE EXAMPLE 10 TO 14

Films were produced in the same manner as in Examples 1 to 9 and Comparative Examples 1 to 4 except that the predetermined amounts of the components (A), (B), (C) and (D) as shown in Table 2 were used, and then were measured for physical properties. The results are shown in Table 2.

EXAMPLES 35 AND 36

90 μm thick films were produced in the same manner as in Examples 26 to 34, and then were measured for physical properties. The results are shown in Table 2.

TABLE 2

| | Formulation | | | | | | | | Physical Properties | | | | | |
|---|---|---|---|---|---|---|---|---|---|---|---|---|---|---|
| | Component (A) *1 | | Component (B) *2 | | Component (C) *3 | | Component (D) *4 | | Blocking Properties (g/100 cm²) | Static Coefficient of Friction | Visible Transparency | Heat Sealability | Antistatic Properties | Remarks |
| | Type | Parts by weight | Type | Parts by weight | Type | Parts by weight | Type | Parts by weight | | | | | | |
| Example 26 | LL-I | 100 | k | 0.4 | e | 0.2 | i | 0.4 | 11 | 0.13 | 12.5 | 980 | ◐α | |
| Example 27 | " | " | " | 1.0 | " | 0.1 | " | 0.6 | 10 | 0.12 | 13.9 | 950 | ◯ | |
| Example 28 | " | " | l | 0.5 | " | 0.2 | j | 0.5 | 10 | 0.12 | 12.7 | 970 | ◯ | |
| Example 29 | " | " | m | 0.7 | " | 0.1 | " | 0.5 | 9 | 0.13 | 13.5 | 970 | ◯ | |
| Example 30 | " | " | k | 0.4 | f | 0.02 | i | 0.5 | 11 | 0.14 | 12.2 | 960 | ◯ | |
| Example 31 | " | " | " | 0.7 | g | 0.80 | " | 0.8 | 8 | 0.12 | 13.8 | 950 | ◯ | |
| Example 32 | LL-II | " | l | 0.3 | e | 0.10 | " | 0.4 | 10 | 0.11 | 12.1 | 1090 | ◯ | |
| Example 33 | " | " | k | 0.5 | " | 0.10 | " | 0.4 | 8 | 0.10 | 12.4 | 1090 | ◯ | |
| Example 34 | LL-III | " | " | 0.7 | " | 0.20 | " | 0.5 | 9 | 0.10 | 11.8 | 940 | ◯ | |
| Example 35 | LL-I | " | l | 0.7 | — | — | " | 0.4 | 15 | 0.12 | 13.9 | 4500 | ◯ | |
| Example 36 | LL-II | " | k | 0.4 | f | 0.05 | j | 0.5 | 20 | 0.14 | 14.2 | 4900 | ◯ | |
| Comparative Example 10 | LL-I | 100 | *5 | | e | 0.2 | " | 0.4 | 9 | 0.10 | 16.0 | 960 | × | |
| Comparative Example 11 | " | " | *1 *8 | 0.7 | " | 0.2 | " | 0.4 | 11 | 0.12 | 19.2 | 950 | △ | |
| Comparative Example 12 | " | " | *2 | — | — | — | " | 0.4 | 105 | 1.6< | 11.9 | 1000 | ◯ | |
| Comparative Example 13 | " | " | k | 0.4 | " | 0.2 | " | 3.5 | 53 | 0.24 | 13.0 | 890 | ◯ | |
| Comparative Example 14 | LL-III | " | " | 0.4 | h | 0.07 | " | 0.4 | 99 | 1.6< | 12.8 | 990 | ◯ | *7 |

* ◐: Synthetic Silica
* ◯: Diatomaceous earth
*1 Same as in Table 1
*2 Zeolite
k: Ca-A-type zeolite
Average particle diameter: 2.8 μm; particles having a particle diameter falling within the range of ½ to 3/2 of the average particle diameter constitute 90% of all particles; manufactured by Nippon Kagaku Kogyo Co., Ltd.; trade name: Ca-100P
l: Mg-A-type zeolite
Average particle diameter: 2.8 μm; particles having a particle diameter falling within the range of ½ to 3/2 of the average particle diameter constitute 82% of all particles; manufactured by Nippon Kagaku Kogyo Co., Ltd.; trade name: Ga-100P
m: Na-A-type zeolite
Average particle diameter: 2.0 μm; particles having a particle diameter falling within the range of ½ to 3/2 of the average particle diameter constitute 90% of all particles; manufactured by Mizusawa Kagaku Kogyo Co., Ltd.; trade name: Sirton M
*3
*4 } Same as in Table 1
*5
*7
*8 Diatomaceous earth
Average particle diameter: 5.5 μm; particles having a particle diameter falling within the range of ½ to ⅔ of the average particle diameter constitute 50% of all particles

EXAMPLES 37 TO 45, AND COMPARATIVE EXAMPLES 15 TO 19

Films were produced in the same manner as in Examples 1 to 9 and Comparative Examples 1 to 4 except that the predetermined amounts of the components (A), (B), (C) and (D) as shown in Table 3 were used, and then were measured for physical properties. The results are shown in Table 3.

EXAMPLES 46 AND 47

90 μm thick films were produced in the same manner as in Examples 37 TO 45, and then were measured for physical properties. The results are shown in Table 3.

TABLE 3

| | Formulation | | | | | | | | Physical Properties | | | | | |
|---|---|---|---|---|---|---|---|---|---|---|---|---|---|---|
| | Component (A) *1 | | Component (B) *2 | | Component (C) *3 | | Component (D) *4 | | Blocking Properties (g/100 cm²) | Static Coefficient of Friction | Visible Transparency | Heat Sealability | Antistatic Properties | Remarks |
| | Type | Parts by weight | Type | Parts by weight | Type | Parts by weight | Type | Parts by weight | | | | | | |
| Example 37 | LL-IV | 100 | k | 0.4 | e | 0.2 | i | 0.4 | 10 | 0.12 | 12.4 | 990 | ⊕ | |
| Example 38 | " | " | " | 1.0 | " | 0.1 | " | 0.6 | 9 | 0.12 | 14.0 | 940 | ○ | |
| Example 39 | " | " | l | 0.5 | " | 0.2 | j | 0.5 | 9 | 0.13 | 12.7 | 990 | ○ | |
| Example 40 | " | " | m | 0.7 | h | 0.1 | " | 0.5 | 8 | 0.13 | 13.7 | 970 | ○ | |
| Example 41 | " | " | k | 0.4 | g | 0.02 | " | 0.5 | 10 | 0.15 | 12.3 | 970 | ○ | |
| Example 42 | " | " | " | 0.7 | e | 0.80 | " | 0.8 | 8 | 0.11 | 13.8 | 960 | ○ | |
| Example 43 | LL-V | " | " | 0.3 | " | 0.10 | i | 0.4 | 9 | 0.11 | 12.2 | 1090 | ○ | |
| Example 44 | " | " | l | 0.5 | " | 0.10 | " | 0.4 | 8 | 0.11 | 12.4 | 1100 | ○ | |
| Example 45 | LL-VI | " | k | 0.7 | " | 0.20 | " | 0.5 | 8 | 0.09 | 11.8 | 960 | ○ | |
| Example 46 | LL-IV | " | " | 0.7 | — | — | " | 0.4 | 13 | 0.10 | 14.0 | 4400 | ○ | |
| Example 47 | LL-V | " | l | 0.4 | f | 0.05 | j | 0.4 | 18 | 0.13 | 14.3 | 4800 | ○ | |
| Comparative Example 15 | LL-IV | 100 | *5 | 0.7 | e | 0.2 | " | 0.4 | 9 | 0.10 | 16.1 | 970 | × | |
| Comparative Example 16 | " | " | *8 *1 | 0.7 | " | 0.2 | " | 0.4 | 11 | 0.13 | 19.3 | 950 | △ | |
| Comparative Example 17 | " | " | *2 | — | " | 0.2 | " | 0.4 | 100 | 1.6< | 11.9 | 1100 | ○ | |
| Comparative Example 18 | " | " | k | 0.4 | " | 0.2 | i | 3.5 | 48 | 0.26 | 13.0 | 900 | ○ | *7 |
| Comparative Example 19 | LL-VI | " | " | 0.4 | h | 0.07 | " | 0.4 | 90 | 1.6< | 12.6 | 1000 | ○ | |

*⊕: Synthetic Silica
*○: Diatomaceous Earth
*1 Polyethylene
LL-IV:
  Ethylene unit content 96 mol %
  Butene-1 unit content 2 mol %
  Octene-1 unit content 2 mol %
  MFR, 28; density, 0.920 g/cm³; MI, 2.0 g/10 min
LL-V:
  Ethylene unit content 98.6 mol %
  Propylene-1 unit content 0.8 mol %
  Octene-1 unit content 0.6 mol %
  MFE, 31; density, 0.935 g/cm³; MI, 2.0 g/10 min
LL-VI:
  Blend of 80 wt % of the above LL-A and 20 wt % of high pressure process low density polyethylene (density: 0.921 g/cm³; MI: 3.0 g/10 min)
*2: Same as in Table 2
*3
*4 } Same as in Table 1
*5
*7 } Same as in Table 2
*8: Same as in Table 2

EXAMPLES 48 TO 56, AND COMPARATIVE EXAMPLES 20 TO 23

Films were produced in the same manner as in Examples 1 to 9 and Comparative Examples 1 to 4 except that the predetermined amounts of the components (A), (B), (C) and (D) as shown in Table 4 were used, and then were measured for physical properties. The results are shown in Table 4.

EXAMPLES 57 AND 58

90 μm thick films were produced in the same manner as in Examples 48 to 56, and then were measured for physical properties. The results are shown in Table 4.

EXAMPLES 59 TO 68 AND 71 COMPARATIVE EXAMPLES 24 TO 28

Films were produced in the same manner as in Examples 57 TO 55 and Comparative Examples 20 TO 23 except that the predetermined amounts of the components (A), (B), (C) and (D) as shown in Table 4 were used, and then were measured for physical properties. The results are shown in Table 4.

EXAMPLES 69 AND 70

90 μm thick films were produced in the same manner as in Examples 59 TO 68 AND 71, and then were measured for physical properties. The results are shown in Table 4.

TABLE 4

| | Formulation | | | | | | | Physical Properties | | | | | |
|---|---|---|---|---|---|---|---|---|---|---|---|---|---|
| | Component (A) *1 | | Component (B) *2 | | Component (C) *3 | | Component (D) *4 | | Blocking Properties (g/100 cm²) | Static Coefficient of Friction | Visible Transparency | Heat Sealability | Antistatic Properties | Remarks |
| | Type | Parts by weight | Type | Parts by weight | Type | Parts by weight | Type | Parts by weight | | | | | | |
| Example 48 | LL-A | 100 | a | 0.2 | e | 0.2 | — | — | 9 | 0.11 | 10.1 | 1000 | — | |
| Example 49 | " | " | " | 0.5 | " | 0.1 | — | — | 8 | 0.09 | 11.0 | 950 | — | |
| Example 50 | " | " | b | 0.3 | " | 0.2 | — | — | 9 | 0.10 | 10.2 | 970 | — | |
| Example 51 | " | " | c | 0.2 | " | 0.2 | — | — | 10 | 0.10 | 9.6 | 960 | — | |
| Example 52 | " | " | a | 0.2 | f | 0.02 | — | — | 7 | 0.12 | 10.5 | 930 | — | |
| Example 53 | " | " | " | 0.2 | g | 0.8 | — | — | 9 | 0.09 | 12.6 | 950 | — | |
| Example 54 | LL-B | " | " | 0.1 | e | 0.1 | — | — | 11 | 0.09 | 10.3 | 980 | — | |
| Example 55 | " | " | b | 0.15 | " | 0.1 | — | — | 8 | 0.11 | 9.7 | 970 | — | |
| Example 56 | LL-A | " | d | 0.2 | " | 0.2 | — | — | 6 | 0.11 | 10.2 | 1070 | — | *6 |
| Comparative Example 20 | " | " | — | — | " | 0.2 | — | — | 45 | 0.10 | 7.8 | 960 | — | |
| Comparative Example 21 | " | " | a | 3.0 | " | 0.2 | — | — | 6 | 0.09 | 20.5 | 970 | — | |
| Comparative Example 22 | LL-A | 100 | a | 0.2 | e | 2.0 | — | — | 10 | 0.09 | 11.0 | 710 | — | |
| Comparative Example 23 | " | " | " | 0.2 | h | 0.2 | — | — | 41 | 0.65 | 10.5 | 850 | — | |
| Example 57 | " | " | b | 0.2 | f | 0.05 | — | — | 10 | — | 17.0 | 4500 | — | |
| Example 58 | LL-B | " | " | 0.15 | " | 0.2 | — | — | 12 | — | 18.3 | 4500 | — | |
| Example 59 | LL-C | " | a | 0.5 | e | 0.25 | i | 0.4 | 9 | 0.12 | 10.5 | 940 | ○ | |
| Example 60 | LL-A | " | " | 0.6 | " | 0.2 | " | 0.7 | 10 | 0.11 | 13.0 | 980 | ○ | |
| Example 61 | " | " | " | 1.2 | " | 0.15 | " | 0.3 | 9 | 0.12 | 14.3 | 940 | ○ | |
| Example 62 | " | " | b | 0.7 | f | 0.1 | " | 0.5 | 11 | 0.13 | 13.2 | 960 | ○ | |
| Example 63 | " | " | c | 0.6 | e | 0.05 | " | 0.6 | 11 | 0.12 | 12.3 | 990 | ○ | |
| Example 64 | " | " | a | 0.5 | g | 0.80 | " | 0.8 | 8 | 0.14 | 12.4 | 970 | ○ | |
| Example 65 | " | " | " | 0.8 | e | 0.10 | " | 0.8 | 10 | 0.13 | 13.9 | 960 | ○ | |
| Example 66 | LL-B | " | a | 0.3 | " | 0.10 | " | 0.4 | 10 | 0.13 | 12.0 | 1100 | ○ | |
| Example 67 | " | 100 | b | 0.6 | " | 0.2 | " | 0.8 | 12 | 0.11 | 12.8 | 1090 | ○ | |
| Example 68 | LL-C | " | a | 0.6 | — | — | " | 0.5 | 10 | 0.12 | 12.6 | 960 | ○ | |
| Example 69 | LL-A | " | " | 0.6 | f | 0.07 | " | 0.5 | 14 | 0.10 | 13.9 | 4500 | ○ | |
| Example 70 | LL-B | " | " | 0.4 | e | 0.2 | j | 0.4 | 20 | 0.11 | 14.3 | 4700 | ○ | |
| Example 71 | LL-A | " | d | 0.8 | " | 0.2 | i | 0.4 | 9 | 0.11 | 12.5 | 980 | ○ | |
| Comparative Example 24 | " | " | — | — | " | 0.2 | " | 0.4 | 105 | 1.6< | 11.9 | 1050 | ○ | |
| Comparative Example 25 | " | " | a | 0.5 | " | 2.0 | " | 0.4 | 10 | 0.10 | 13.8 | 710 | ○ | |
| Comparative Example 26 | " | " | " | 0.5 | " | 0.2 | " | 3.5 | 45 | 0.28 | 13.1 | 870 | ○ | *7 |
| Comparative Example 27 | LL-C | " | " | 0.5 | h | 0.07 | j | 0.4 | 90 | 1.6< | 13.1 | 950 | ○ | |
| Comparative Example 28 | LL-A | " | *5 | 0.7 | e | 0.2 | " | 0.4 | 9 | 0.12 | 16.1 | 950 | × | |

*1 : Synthetic Silica
*1: Same as in Table 3
*2
*3
*4 } Same as in Table 1
*5
*6
*7

What is claimed is:

1. A polyethylene resin composition comprising:
   (A) 100 parts by weight of a low density polyethylene,
   (B) 0.01 to 2.0 parts by weight of an anhydrous amorphous aluminosilicate having the basic particle characteristics of zeolite as prepared by acid-treating zeolite,
   (C) 0 to 1.5 parts by weight of fatty acid amide having a melting point of not more than 130° C., and
   (D) 0 to 3.0 parts by weight of an antistatic agent.

2. The polyethylene resin composition as claimed in claim 1, wherein the low density polyethylene is straight-chain low density polyethylene consisting of 80 to 99.8 mol% of an ethylene unit and 0.2 to 20 mol% of an α-olefin unit having 3 to 12 carbon atoms.

3. The polyethylene resin composition as claimed in claim 1, wherein the low density polyethylene is straight-chain low density polyethylene consisting of 90 to 99 mol% of an ethylene unit, 0.4 to 9.5 mol% of an α-olefin unit having 3 to 4 carbon atoms and 0.4 to 9.5 mol% of an α-olefin unit having 6 to 12 carbon atoms.

4. The polyethylene resin composition as claimed in claim 1, wherein the low density polyethylene is a blend of straight-chain low density polyethylene and high pressure process low density polyethylene.

5. The polyethylene resin composition as claimed in claim 4, wherein the straight-chain low density polyethylene is composed of 80 to 99.8 mol% of an ethylene unit and 0.2 to 20 mol% of an α-olefin unit having 3 to 12 carbon atoms.

6. The polyethylene resin composition as claimed in claim 4, wherein the straight-chain low density polyethylene is composed of 90 to 99 mol% of an ethylene unit, 0.4 to 9.5 mol% of an α-olefin unit having 3 to 4 carbon atoms and 0.4 to 9.5 mol% of an α-olefin unit having 6 to 12 carbon atoms.

7. The polyethylene resin composition as claimed in claim 1, wherein the fatty acid amide is selected from the class consisting of erucic acid amide, stearic acid amide, oleic acid amide, behenic acid amide, N-stearylbutyric acid amide, N-stearylcaprylic acid amide, N-stearyllaurylic acid amide, N-stearylstearic acid amide, N-stearylbehenic acid amide, N-oleyloleic acid amide, N-oleylbehenic acid amide, N-butylerucic acid amide, N-octylerucic acid amide, and N-laurylerucic acid amide.

8. The polyethylene resin composition as claimed in claim 1, wherein the antistatic agent is selected from the class consisting of cationic compound, anionic compound, nonionic compound and amphoteric compound.

9. The polyethylene resin composition as claimed in claim 1, wherein the antistatic agent is polyoxyethylenealkylamine, polyoxyethylene, alkylamide, their fatty acid esters or their glycerine fatty acid esters.

10. The polyethylene resin composition as claimed in claim 1 wherein the low density polyethylene has a density of 0.910 to 0.960 g/cm$^3$.

11. The polyethylene resin composition of claim 10 wherein the density of the low density polyethylene is 0.915 to 0.940 g/cm$^3$.

12. The low density polyethylene composition of claim 10 wherein the density of the low density polyethylene is 0.910 to 0.940 g/cm$^3$.

* * * * *